Nov. 24, 1964    R. P. NEWMAN    3,157,930
FLUID OPERATED CLAMP
Filed Sept. 19, 1963

Robert P. Newman INVENTOR.

3,157,930
FLUID OPERATED CLAMP
Robert P. Newman, North Massapequa, N.Y., assignor to Specialties, Incorporated, a corporation of New York
Filed Sept. 19, 1963, Ser. No. 310,027
2 Claims. (Cl. 24—257)

This invention relates to fluid actuated clamps for holding shafts or other objects.

The invention comprises a fluid operated clamp having jaws which can be quickly applied to an object by cam action, and quickly released. A relatively small hydraulic force produces a tight clamping action, without lost motion. An outstanding advantage of the invention is that strong clamping force on a pipe or other object can be rapidly effected without any appreciable rotational or axial shift of the object being clamped.

In machines of various types, in machine tools, and in devices of wide variety it is often desired to clamp a shaft or other member without imparting any movement to the member due to application of the clamp. Some prior clamps have had lost motion, looseness, or other faults which caused some movement of the shaft or other object clamped when the jaws or other clamping members were tightened. It is, therefore, an object of the present invention to provid a fluid operated clamp which will hold an object in stationary position during the clamping operation and afterward until the clamp is released. This clamp is especially designed to hold a pipe or other cylindrical object against both rotary and linear movement.

Another object is to provide a clamp which can be applied very quickly without causing movement of the object clamped.

A further object is to provide a clamp which can be applied quickly and tightly by admitting a relatively small quantity of fluid under pressure to a cylinder.

An additional object is to provide a fluid operated clamp in which opposing forces reduce stress in clamping members.

Another object is to provide a fluid operated clamp which is quickly released when the fluid pressure is sufficiently reduced.

Other objects will be evident in the specification.

Figure 1:
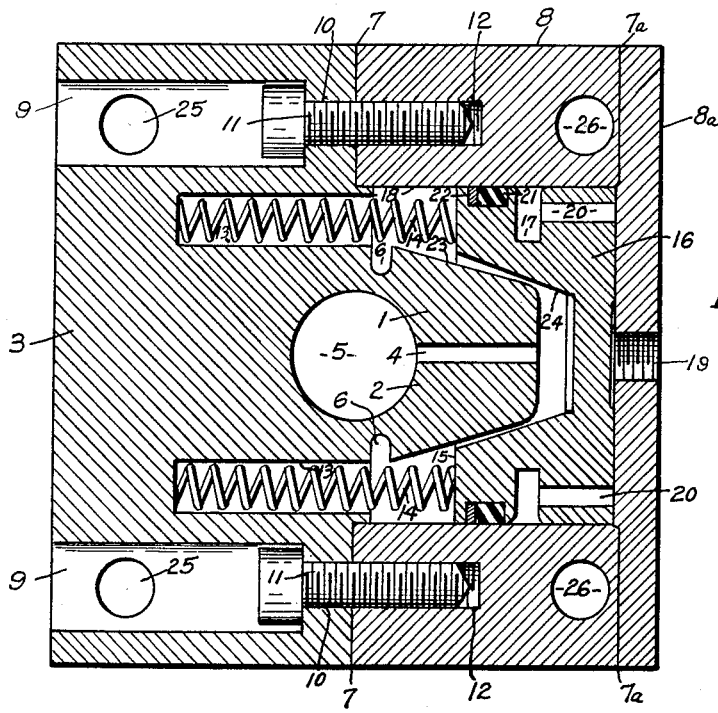
FIGURE 1 is a part sectional elevation of my clamping device.

FIGURE 1 shows clamping members or jaws 1 and 2 integral with metal or other block 3 and separated by gap 4. A shaft or other object can be inserted in circular opening 5 which permits easy axial movement of a shaft therethrough but the fit is preferably close so that a small movement of jaws or members 1 and 2 toward each other will cause tight clamping of the shaft. The jaws are cut away or notched at slots 6 so that a shaft can be clamped without excessive pressure on the jaws. The reduced thickness of the jaws at the notches allows easier bending of the jaws 1 and 2. If desired, the notches may be placed more nearly in line with the diametral plane passing through the axis of cylindrical opening 5 and the interfaces 7 of blocks 3 and 8.

Block 3 has bores 9 and reduced bores 10 through which socket head type screws 11 are passed, to be screwed into threaded bores 12 in block 8. Bores 13 are also provided in block 3 and contain compression springs 14 which are compressed against the end walls of these bores and against the annular or otherwise shaped face 15 of piston 16 which has circumferential groove 17 and which is slidable in axial direction in cylinder 18 in block 8. This cylinder has threaded port 19 in which a threaded pipe may be screwed for supplying oil, air, or other fluid to the cylinder to cause movement of piston 16 to the left. This piston has channels 20 for supplying pressure fluid to circumferential slot 17. The piston has another circumferential slot or groove in which resilient O ring 21 and back-up ring 22 are placed. These rings are for sealing the piston against leakage.

The jaws 1 and 2 are, generally, of frusto-conical configuration and have tapered surfaces 23 which are separated by slot or space 4. Flaring inner surface 24 of the piston has a wider taper than that of the jaws in order to prevent a locking or binding action. The surfaces 23 and 24 may be true conical surfaces or they may be curved with respect to the axis of surfaces 23 and 24. The curvature may be of any suitable character such as spheroidal, parabolic, or otherwise. The important factors in the design are to utilize the cam action of the different slopes or angles to cause increased pressure tending to close the jaws; to permit easy and quick release of the clamp, and to provide suitably shaped surfaces to prevent excessive friction and wear. The surfaces 23 and 24 should be designed to provide sufficient contact area to prevent excessive contact pressure. A dry type lubricant can be used if it is prevented from entering cylindrical opening 5.

The abutting surfaces of members 3 and 8 may, if desired, be ground so that they are in leak-proof contact along plane or interface 7, or, in some cases, a tightly packed or compressed gasket may be placed between these surfaces. The through bores 25 in block 3 and bores 26 in block 8 may be provided so that the device can be attached to a hydraulic cylinder or to any other support by means of screws or bolts passed through the bores 25 and 26. A drain hole connecting with the space surrounding surfaces 23 should be provided to discharge any fluid leaking past the piston rings.

The outside shape of the assembled clamp or device may be generally rectangular or of any suitable shape. The shaft, pipe, or other member passed through opening 5 may be protected from grit, or particles of any kind by means of suitable packing glands attached to the device and surrounding the shaft.

Figure 2:
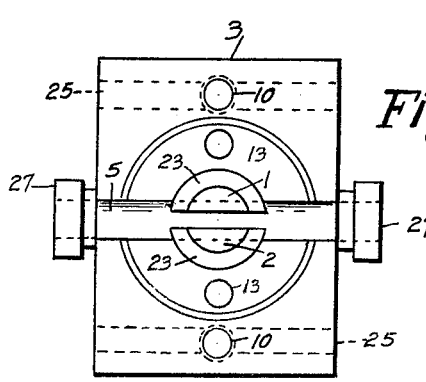
FIGURE 2 is a front elevation of the clamping portion of the device shown in FIGURE 1, with packing glands.
Figure 3:
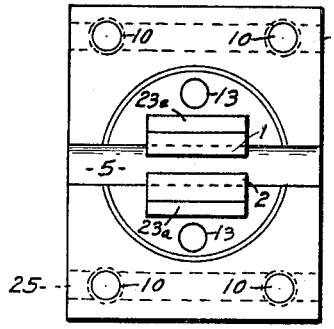
FIGURE 3 is a front elevation of the clamping portion of a device similar to that shown in FIGURE 1 but with modified clamping jaws.
Figure 4:
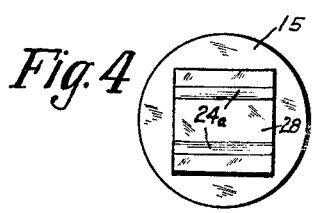
FIGURE 4 is an elevation of a piston used to engage the jaws of the clamp shown in FIGURE 3.

In FIGURES 2, 3, and 4 like parts are given similar numerals as in FIGURE 1. Referring to FIGURE 2, packing glands 27 are shown attached to block 3, for the purpose of preventing grit or other material from getting between the jaws of the clamp and the shaft which is placed in cylindrical channel 5 part of which is shown extending beyond jaws 1 and 2 as semi-cylindrical troughs. The matching portions of channel 5 are in block 8.

FIGURE 3 shows a modification of the invention in which the jaws 1 and 2 have cam surfaces 23a generated by lines parallel with the axis of channel 5. In this case the piston face 15 will have similarly shaped cam surfaces 24a for engaging surfaces 23a (FIG. 4). As before, the angle of surfaces 24a with respect to the mid plane of slot 4 can be different from the angle of surfaces 23a relative to the mid plane of that gap or slot. The cam surfaces rise from the back wall 28 of the piston recess in a direction toward the piston face 15. The wide jaw construction described can provide more clamping force, for similar dimensions, than the conical construction shown in FIGURE 1. Two blocks 3 and 8 will be screwed or bolted together, in either case.

In operation, a shaft, pipe, or other object is placed in opening 5, the space between the shaft and jaws being just enough to allow easy sliding relative movement. When it is desired to clamp the shaft, oil or other fluid under pressure is admitted through a pipe screwed into opening or port 19. This fluid passes through channels 20 in piston 16 and exerts pressure on the cross sectional area of the piston, being prevented from leaking past the piston by rings 21 and 22. Leftward movement of the piston, as seen in FIGURE 1, causes flared or conical surface 24 to press jaws 1 and 2 toward each other thereby clamping the shaft tightly between the jaws. It should be noted that this clamping method does not impart any axially directed force to the shaft which, accordingly, is firmly clamped by the jaws without axial displacement which has been a shortcoming of prior clamping devices. In my clamping device the forces are applied to the shaft perpendicularly to the axis thereof and the clamps grip the shaft uniformly around the circumference. Furthermore, after the clamp is applied, no clearance exists between the shaft and the clamp to permit unwanted displacement. This result is accomplished partly at least by the fact that the clamping jaws are formed from a single piece.

The relatively small angle between surface 23 and the axis of the jaws causes an amplification of force tending to push the jaws together. A beneficial effect is made posible by the channels 20 since the fluid pressure admitted to the circumferential groove 17 exerts an inward generally radial force on the piston tending to balance or reduce the outward generally radial force on the piston caused by engagement of surfaces 23 and 24. This compensating feature will reduce the tendency of piston 16 to bind in cylinder 18. Upon release of fluid pressure in cylinder 18 the springs 14 quickly move piston 16 back to its jaw-releasing position. The resiliency in the jaws causes them to spring apart to release the shaft quickly, although a compression spring could be placed between the jaws to help force them apart.

Advantages of this fluid operated clamp are that it is quickly applied and quickly released; a relatively small fluid force can produce a relatively large clamping force; the device is self-adjusting for wear; tight clamping is provided without lost motion and without undesired displacements; and a force balancing principle is employed to produce greater reliability of operation.

Various modifications of the invention are possible. For example, the cylinder portion 8 can be integral with the block or body 3 in which case the separating plane or interface 7 will be moved to the position indicated at 7a. Under these circumstances the cylinder plate or wall 8a will be screwed to cylindrical portion 8 in leakproof manner. Both surfaces or abutting planes 7 and 7a could be used as shown but ordinarily only one joining plane or interface would be involved.

What I claim is:

1. In a fluid operated clamping device, a clamping member including a pair of spaced clamping jaws integral therewith and projecting therefrom, said jaws having curved surfaces of tapered radius relative to the axis of said jaws, said clamping member having a circular opening therethrough with an axis at right angles to the axis of said jaws, each said jaw having a groove therearound adjacent said opening, a second member having a cylindrical space therein coaxial with said jaws, a piston in said cylindrical space and having a frusto-conical inner surface for engaging said jaws, means attaching said second member to said clamping member, said piston having a groove therearound and a channel leading from said groove to the face of said piston, spring means for moving said piston out of contact with said jaws, said second member having a port for admitting fluid to said cylindrical space to force said piston into contact with said jaws.

2. In a fluid operated clamping device, a clamping member including a pair of spaced clamping jaws integral therewith and projecting therefrom, said jaws having plane surfaces sloped toward the axis of said jaws in a direction toward the tips thereof, said clamping member having a circular opening therethrough with an axis at right angles to the axis of said jaws, each said jaw being grooved near said circular opening to reduce rigidity thereof, a second member having a cylindrical space therein coaxial with said jaws, a piston in said space and having cam surfaces for engaging the sloped surfaces of said jaws to force them into position to clamp a member in said circular opening, means attaching said second member to said clamping member, said piston having a groove therearound and a channel connecting said groove with said cylindrical space, spring means for moving said piston out of contact with said jaws, said second member having a port for admitting fluid to said cylindrical space to force said piston into contact with said jaws.

References Cited by the Examiner

UNITED STATES PATENTS

| | | | |
|---|---|---|---|
| 964,416 | 7/10 | Fuller | 279—4 |
| 965,893 | 8/10 | Hanson | 279—4 |
| 2,339,799 | 1/44 | Obecny | 279—4 |
| 2,415,520 | 2/47 | Obecny | 269—25 |
| 2,620,196 | 12/52 | Church | 279—4 |
| 2,655,384 | 10/53 | Peterson | 279—4 |
| 2,683,040 | 7/54 | Graham | 279—4 |

FOREIGN PATENTS 734,980    5/43    Germany.

DONLEY J. STOCKING, *Primary Examiner.*